United States Patent [19]

Whitney

[11] Patent Number: 4,701,069
[45] Date of Patent: Oct. 20, 1987

[54] RAIN DRAINAGE GROOVES IN A ROAD AND APPARATUS FOR MAKING THEM

[76] Inventor: James R. Whitney, P.O. Box 4000, Woodbridge, Va. 22194

[21] Appl. No.: 940,055

[22] Filed: Dec. 10, 1986

[51] Int. Cl.$^4$ .................. E01C 9/04; E01C 11/22; E01C 23/16
[52] U.S. Cl. ............................... 404/75; 404/16; 404/4; 404/94; 404/98; 404/96; 299/40; 116/63 R
[58] Field of Search .................. 404/2, 4, 7, 9, 14-16, 404/72, 75, 87, 89, 90, 93, 94, 96, 98, 12, 71, 122; 299/37, 39, 40; 116/63 R

[56] References Cited

U.S. PATENT DOCUMENTS

| | | | |
|---|---|---|---|
| 2,574,090 | 11/1951 | Dofsen | 404/15 |
| 2,826,128 | 3/1958 | Summers | 404/12 |
| 3,094,046 | 6/1963 | Zipelius | 404/12 |
| 3,407,005 | 10/1968 | Simms et al. | 299/39 |
| 3,529,517 | 9/1970 | Liddle et al. | 404/72 X |
| 3,801,211 | 4/1974 | Perkins | 404/75 |
| 3,868,146 | 2/1975 | Ellis | 299/39 |
| 3,874,806 | 4/1975 | Grist et al. | 404/75 X |
| 3,929,377 | 12/1975 | Weaver et al. | 299/39 X |
| 4,575,278 | 3/1986 | Whitney | 404/72 |

FOREIGN PATENT DOCUMENTS

| | | | |
|---|---|---|---|
| 2209743 | 9/1973 | Fed. Rep. of Germany | 404/93 |
| 3200862 | 7/1983 | Fed. Rep. of Germany | 404/90 |

Primary Examiner—Stephen J. Novosad
Assistant Examiner—John F. Letchford
Attorney, Agent, or Firm—Thomas J. Greer, Jr.

[57] ABSTRACT

An apparatus and method for cutting rain drainage grooves in a road surface, such as at the edges of the road to form a road marker system. A cutting cylinder rotates about its longitudinal axis, the latter lying in a substantially horizontal plane and at some angle, generally a right angle, to the road direction. The cutting cylinder is mounted on a frame, the latter attached to and carried by an automotive vehicle such as a truck. As the truck travels along the road, the cutting cylinder is moved alternately up and down, into the road surface, and forms the grooves. The cutting cylinder can be slightly tilted, so as to produce grooves of variable width and depth. The truck moves along the road being grooved at a substantially uniform speed. Preferably, the slopping side walls of the grooves are coated with a retro reflective coating. The grooves continuously drain rain so that the retro reflective coating is visible during hours of darkness and rain, to maintain visibility of the road edge to drivers. The grooves also function as a rumble strip.

13 Claims, 4 Drawing Figures

RAIN DRAINAGE GROOVES IN A ROAD AND APPARATUS FOR MAKING THEM

BACKGROUND OF THE INVENTION

This invention relates to an apparatus for the formation of transverse grooves in a road, more particularly for the formation of rain drainage grooves on the edges of the road. Transversely-extending grooves, i.e., grooves which are not parallel to the longitudinal axis of the road, are known. Generally, such grooves have been employed to define what is known in this art as rumble strips. Rumble strips may be defined by either a series of raised strips, often integral with the road surface, or by a series of transversely extending and parallel depressions, the latter being formed, conventionally, by a circular saw blade cutting into the road surface. The walls or sides of such grooves are thus generally vertical. The effect of the rumble strips is to generate noise and vehicle vibration when the wheels of an automobile pass over them to thereby appraise the driver that the vehicle is either to be slowed down or that the vehicle is not in a proper lane or not in a proper portion of the road.

Prior apparatus for making a series of transverse, parallel grooves in an already formed road has suffered the drawback of not being capable of operation in a continuous manner. Namely, whatever element (such as a saw) that is employed to form each groove operates intermittently as regards its advance or motion along the road. Namely, the groove forming element is pushed down into the road surface, the groove is formed while the element is stationary vis-a-vis travel along the road, the element is then raised from the road surface and then is stepwise advanced or indexed along the road to thereby form the next adjacent groove at the next indexing or stepping location.

SUMMARY OF THE INVENTION

According to the practice of this invention, a groove forming element is moved continuously along the edge of a road, with a series of parallel grooves being formed in the road surface. The groove forming element is a rotating, cutting cylinder or barrel which rotates around its own longitudinal axis. While the cylinder is rotating, it moves along the road at a substantially uniform speed and is also moved alternately upwardly and downwardly, the cutting cylinder forming each groove during a portion of its downward motion or dwell. The cutting cylinder then is moved upwardly and, by the time it is again moved downwardly, the apparatus carrying the cutting cylinder has moved along the road so that the next and adjacent groove will be formed and spaced from the first mentioned groove. This process continues indefinitely until the desired number of grooves has been formed along the road. The rotating cutting cylinder is mounted on a wheeled carriage, with the carriage being secured to a frame. The frame, in turn, is detachably mounted and secured to an automotive vehicle such as a truck. The power to drive and rotate the cutting cylinder is typically derived from a rotary hydraulic motor carried by the frame, while the regular periodic up and down movement of the cutting cylinder is carried out by periodic actuation of a linear hydraulic motor of the usual piston and cylinder type. The sides of the grooves are slanted or curved in transverse cross section and may be tapered in longitudinal crosssection. Further, the bottoms of the grooves are either horizontal or are tilted with respect to the horizontal, so that water, such as rain water on the road, will flow along them and off the road surface onto the road shoulder. The curved or slanted sides of the grooves may then be provided with a retro reflective coating such as traffic paint (paint with glass beads or particles), retro reflective tape, or any other retro reflective pavement marking material. In this manner, the grooves will be visible during hours of darkness and rain, as the rain water does not stay on the sides of the grooves, thereby allowing the retro reflective beads or particles of the traffic paint to reflect back the headlights of motorists. In addition, where glare on the road is present from illumination other than from the driver's headlights, a series of shadow depressions will be seen by the driver, these depressions being defined by the grooves.

DETAILED DESCRIPTION OF THE INVENTION

Figure 1:
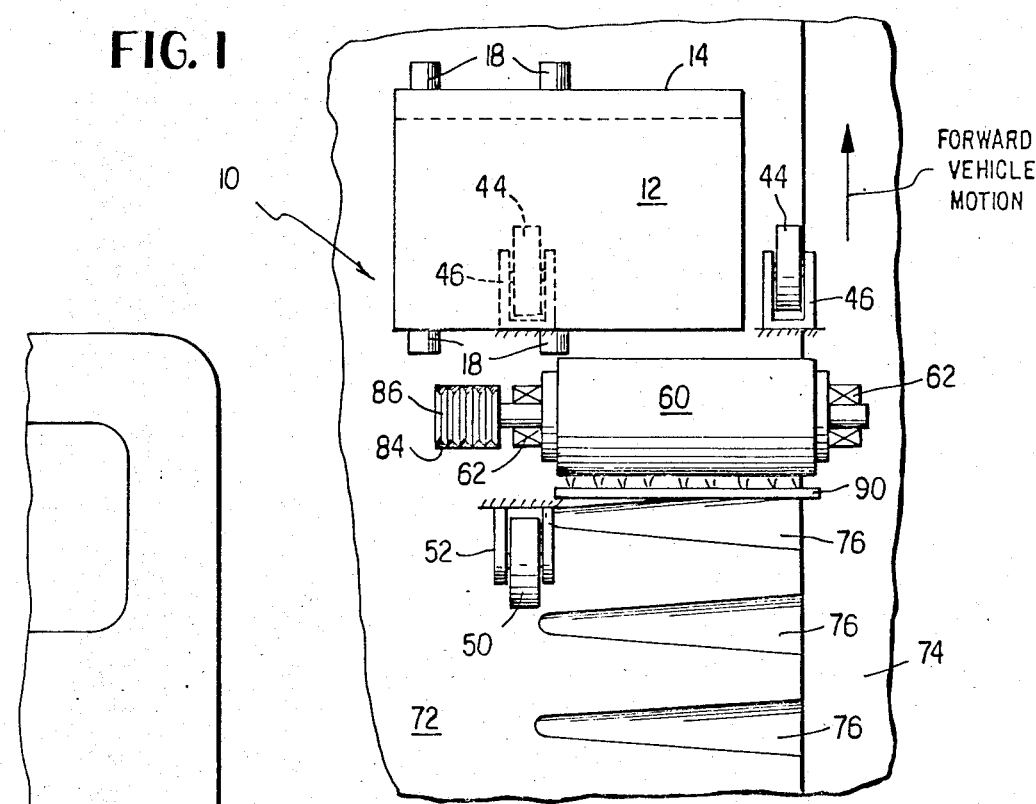
FIG. 1 is a top plan view of the apparatus of this invention, with the housing and support for the cylindrical cutter removed.

Referring now to the drawings, the numeral 10 denotes generally the apparatus of this invention and includes an L member having a horizontal plate 12 and a vertical plate 14, the plates formed of a rigid material such as cast iron. The numeral 18 denotes any of a plurality of pintles extending from opposite edges of plate 12 mounted as by threading or welding them thereon. The pintles 18 are employed to attach the frame to an automotive vehicle, such as a truck. A pair of spaced, slotted bars 20, each having a respective slot 21, is mounted beneath and on a flat bed 22 of a truck 23. Opposite sets of pintles 18 extend into respective slots. This enables the L member to slid beneath the flat bed for travel and to slide laterally from the flat bed, as shown at FIG. 1, for road groove forming.

The numerals 28 and 30 each denote one of a pair of parallel bars, formed from iron for example, an end of each being pivoted to a respective ear carried by L member 12,14. The other ends of bars 28,30 are pivoted to a bar 32. A linear hydraulic motor 34 of the piston and cylinder type is pivotally attached at its upper end to plate 12 and at its lower end to a point on bar 28. Suitable actuation of the hydraulic motor 34 causes bar 32 to move either upwardly or downwardly. The hydraulic lines to the motor 34 are conventional and are not shown.

Figure 3:
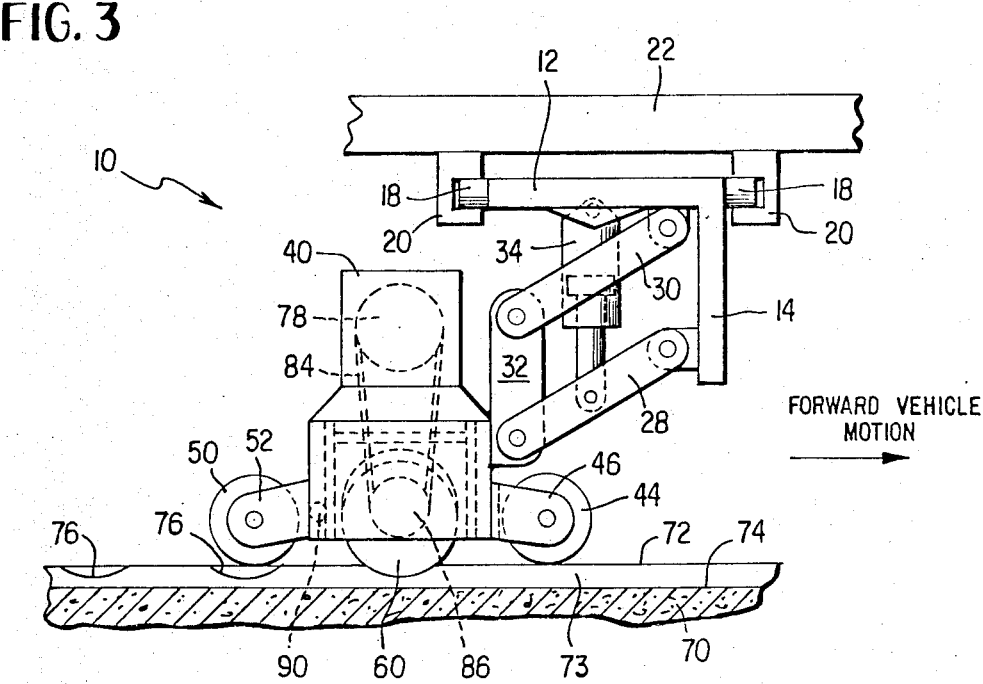
FIG. 3 is a side elevational view of the apparatus of FIG. 1.

A housing 40, shown in full only at FIG. 3 (for clarity in the following description) is attached as by welding to bar 32. Housing 40 is generally rectangular, formed typically of metal plate, and is open at its bottom. Spaced front wheels 44 are mounted on conventional, forked wheel and axle mounting members 46, the latter vertically adjustably mounted by a conventional slot and bolt arrangement to that wall of housing 40 which faces the intended direction of travel along a road. A single rear wheel 50 is mounted on a like wheel and axle mounting member 52, the latter similarly vertically adjustably mounted on the rear wall of housing 40, L member 12,14 and housing 40 define a frame.

A cutting cylinder or barrel 60 carries a rotary bearing 62 at each end, each bearing 62 mounted on a respective opposite interior wall of housing 40. For grooves slanted downward toward the road edge, the mounting is such that the cutting cylinder is slightly tilted to the horizontal, as illustrated. It is thus substantially horizontal since the tilt angle is slight. The surface of cylinder 60 is covered with road cutting/abrasive elements, such as diamonds, so that when rotated about its longitudinal axis and forced down against a portion of a concrete or asphalt road surface, the cylinder will remove that road portion which it contacts to form a groove having curved sides. FIG. 3 indicates the depth of penetration of cutting cylinder 60 into road 70 and shows that this depth is controlled by the forward two wheels 44 and rear wheel 50 when linear hydraulic motor 34 is actuated to move housing 40 down. For a given road composition, the weight of housing 40 and elements carried by it may be sufficient to perform the groove forming operation (to be described). Otherwise, additional downward force can be supplied by linear hydraulic motor 34.

Rotary hydraulic motor 78 is also mounted within and carried by housing 40, this motor carrying a belt sheave 80. Belts 84 couple sheave 80 to sheave 86, the latter affixed to one end of cutting cylinder 60. Rotation of rotary motor 78 thus causes rotation of cutting cylinder 60. Conventional hydraulic lines, not shown, supply motor 78. A conventional hydraulic mechanism, not shown, is carried by truck 23 and supplies pressurized liquid to motors 78 and 34.

A water spray bar 90 is mounted in housing 40, and its outlets along its length, spray water onto the surface of cutting cylinder 60 and/or onto the road surface portion being grooved.

Figure 2:
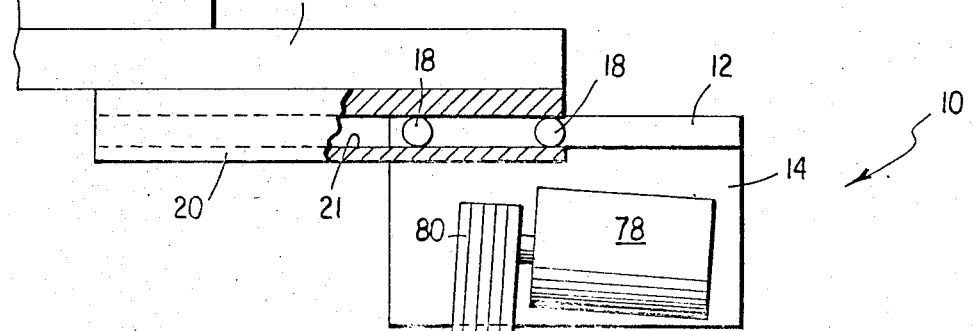
FIG. 2 is a rear view of the apparatus of FIG. 1, also with the housing and support for the cylindrical cutter removed.
Figure 2:
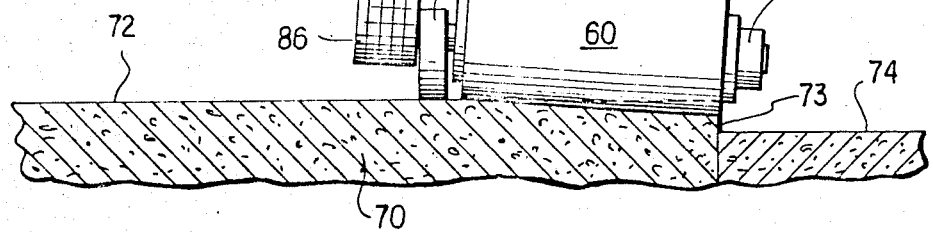
Figure 4:
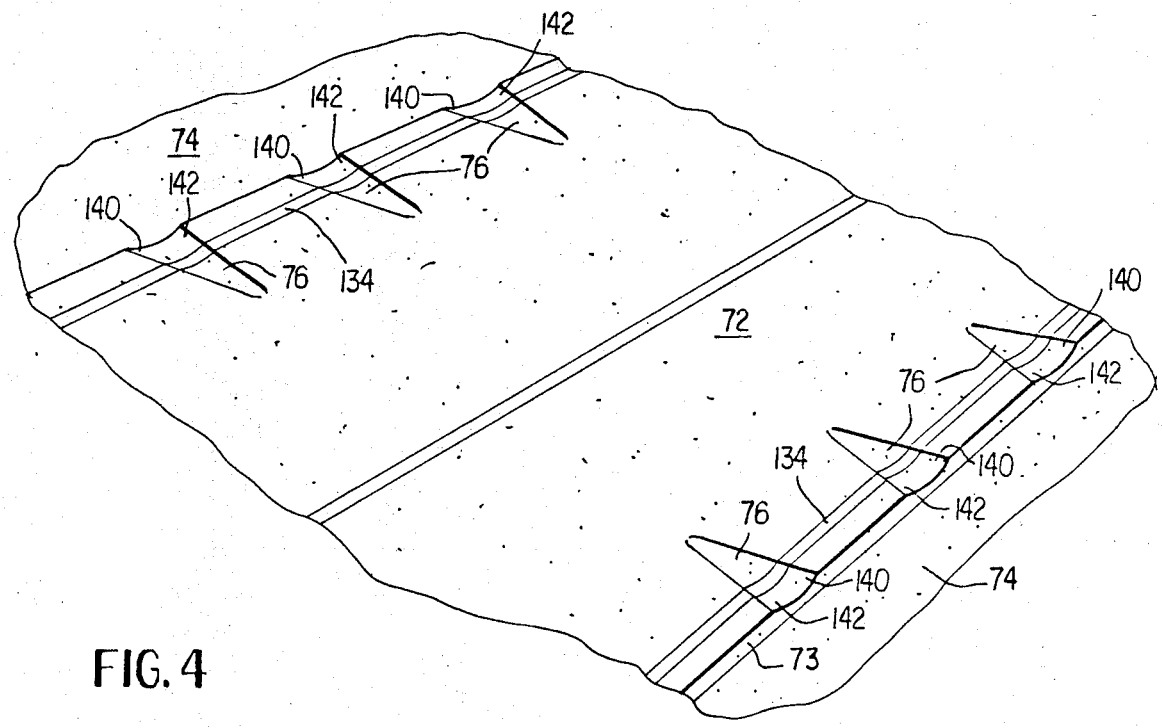
FIG. 4 is a perspective view of a road section which has been grooved by the method and apparatus of this invention.

As shown at FIGS. 2 and 4, road 70 is provided, conventionally, with a shoulder 74 below the edges of the road. The mode of operation of the apparatus is as follows. With the numeral 72 denoting the road surface, the L frame 12,14 is attached, as described above, to an automotive vehicle such as a truck 23, with the truck being driven in the direction of the arrow adjacent the right hand edge 73 of road 70. The frame and truck are so positioned that the right hand end of cutting cylinder 60 extends slightly beyond edge 73 of the road. Rotary motor 78 is started, thereby turning the tilted abrasive cylinder 60. Linear hydraulic motor 34 is actuated to move housing 40 to its lowest position. The rotating cutting cylinder drops onto the surface 72 of road 70, cutting/abrading one of the indicated grooves 76. The depth of the groove 76 is controlled by the difference in height between the lower portion of depth wheels 44 and 50 and the lower portion of the cutting cylinder 60. This difference in vertical level establishes the maximum depth of each groove 76 cut into the edge of the road. Simultaneously with the continued and substantially uniform speed of the truck and frame along the road, linear hydraulic motor 34 is now actuated so as to raise housing 40 to remove the cutting cylinder from contact with the road. Sometime later, the housing 40 is lowered by suitable actuation of linear hydraulic motor 34, with the result that the cutting action of cylinder 60 again takes place this time in a position longitudinally spaced, along the road direction, from the first cut groove 76. The process is now repeated and may be carried out indefinitely until the desired length of the road has been provided with parallel grooves 76. The grooves are normally at right angles to the direction of the road. The process can now be repeated for the other edge of the road. The up and down movement of cutting cylinder 60 is preferably uniformly periodic and is effected by either manually or automatically actuating the hydraulic input/exhaust controls of linear motor 34. The exact curvature of the sides of grooves 76 will depend on the diameter of cylinder 60, the speed of truck 23 along the road, and the up and down velocity of cylinder 60.

Grooves 76 function to drain water from the sides of the road during times of rain. Preferably, sides of grooves 76 are coated with a retro reflective coating of any conventional type, such as relatively bright-colored paint which carries reflective glass particles or beads, or any other conventional retro reflective coating normally used in road striping. Thus, during times of both darkness and rain, light from the headlights of vehicles reflects from the reflective coating on the sides of grooves 76 to enhance visibility of the edge of the road, to thereby apprise drivers of its location. Further, grooves 76 produce the function of a rumble strip, so that there is audible and vibratory apprisement of the edge of the road to vehicle drives.

From a consideration of FIG. 2, it is seen that the axis of rotation of the cutting cylinder is not parallel to the road surface. This axis is slightly tilted with respect to a horizontal plane, with the result being that the drainage grooves 76 are tapered, i.e., they vary in width and depth along their length. If desired, this axis of rotation may be adjusted so that it is parallel to a horizontal plane, in which case the grooves 76 would be of equal width along their length. It is usually desired, however, that grooves 76 slope slightly towards the rim 73 of road 72 to thereby enhance drainage of rain water from the grooves onto the side or shoulder 74 (see FIG. 2) of the road.

The slope of the sides of each groove thus formed will, in general, depend on the rate at which the cutting cylinder 60 is moved into the road, the forward speed of the truck 23 while the cylinder 60 is in contact with the road, and the rate at which the cylinder 60 is moved upwardly from the lowest portion or position. Thus, if the cutting cylinder is moved relatively slowly down, yet is moved up relatively rapidly, then the forwardmost wall of each groove will be steeper than the rearward wall. Conversely, if the cutting cylinder 60 is moved downwardly into the road at a relatively rapid rate, compared to the rate of upward movement, then the forwardmost wall of each groove will not be as steep as the rearward wall.

This is readily visualized by reference to FIG. 4, wherein the forwardmost groove wall side is denoted by the numeral 140 and therein the trailing wall side at each groove is denoted by the numeral 142. It is normally preferable that forwardmost wall side 140 be the steepest, to thereby drain the rain most rapidly and to provide the impact surface which vehicle tires contact to give the most pronounced rumble effect. The exact slope of each groove side 140, 142 is a function of the rate of downward and of upward motion of cylinder 60 and of the speed of the truck 23. Clearly, these rates may be varied to yield different groove slopes. The width of each groove, measured in a horizontal direction, parallel to the road, may be varied by varying the frequency of lowering and raising the cutting cylinder by actuation of motor 34 and by the relative speed of truck 23. The wider the groove, the more pronounced the rumble effect. In practice, a single retro reflective stripe 134 is applied along the road, at each side thereof, to thereby at least partially coat each groove. It is particularly important that the forward wall side 140 of each groove be at least partially coated, to thereby yield the desired reflection of headlights back towards motorists.

The apparatus may also be employed to form rain drainage grooves in a rain draining lane marker, such as grooves 22 of U.S. Pat. No. 4,575,278. Grooves formed in the raised strip of said patent by the method/apparatus of the present invention will yield a more pronounced rumble effect. Thus, the method/apparatus of the present invention is useful for forming grooves in any surface portion of a road, including a raised portion.

I claim:

1. A road marker system including a road having a shoulder below an edge of the road, a plurality of grooves intersecting said edge of said road and having portions which extend into the road surface, each said groove being straight, each groove having a forward side wall and a rearward side wall, the longitudinal axis of each groove being at an angle to the longitudinal direction of the road, the grooves having slanted or arcuate sides, at least a portion of said slanted or arcuate groove sides being coated with a retro reflective coating, the bottoms of the grooves being slanted downwardly towards said road edge, each groove being of a maximum depth at the edge of the road and becoming lesser in depth with increasing distance from the edge of the road, the groove bottoms adjacent said road shoulder being even with or above said shoulder, each groove being of a shape complementary to a portion of the curved surface of a cylinder, whereby rain water will run off the sides of the grooves and into the bottoms of the grooves and out of said bottoms to said road edge and onto said shoulder, to thereby maintain the retro reflective coating free of water so that said coating will be visible to thereby make said road edge visible to motorists during hours of both darkness and rain, and whereby when glare on the road is present from illumination other than from headlights of the driver, a series of shadow depressions will be seen by the driver.

2. The road marker system of claim 10 wherein the forward grooves wall sides are of a different steepness than that of the rearward groove wall sides.

3. A road rumble strip system including a road, a plurality of grooves intersecting the edge of said road, each said groove being straight, each groove having a forward side wall and a rearward side wall, the longitudinal axis of each groove being at an angle to the longitudinal direction of the road, the grooves having slanted or arcuate sides, the bottoms of the grooves being slanted downwardly towards said road edge, each groove being of a maximum depth at the edge of the road and becoming lesser in depth with increasing distance from the edge of the road, each groove being of a shape complementary to a portion of the curved surface of a cylinder, whereby the grooves will yield an audible and vibratory apprisement of the edge of the road to vehicle drivers.

4. The road rumble strip system of claim 3 wherein the steepness of the forward side wall of each groove is greater than the steepness of the rearward side wall.

5. A method of forming a plurality of grooves in the surface of a road, the method including the steps of rotating a cutting cylinder about an axis which is substantially horizontal and which axis is at an angle to the longitudinal direction of the road, moving the rotating cutting cylinder along the road, and simultaneously, moving said cylinder alternately up above the road surface and down into said road surface, to thereby form a plurality of generally parallel grooves in the road each groove having a forward side wall and a rearward side wall.

6. The method of claim 5 wherein said cylinder is moved so that the grooves are formed along at least one edge of the road surface.

7. The method of claim 5 including the additional step of coating at least a portion of the forward side wall of each groove with a retro reflective coating, whereby said coating will be visible to motorists during hours of both darkness and rain.

8. An apparatus for forming grooves in the surface of a road, the apparatus including, a frame adapted to be attached to and carried by a vehicle, a rotatable cutting cylinder mounted on the frame for rotation about its longitudinal axis, said axis being substantially horizontal, and being at an angle to the longitudinal direction of the road, means carried by the frame for moving said cylinder alternately up and down, and means carried by the frame for rotating said cylinder, the cutting cylinder moving alternately up and down as it rotates about its longitudinal axis, whereby the apparatus forms a plurality of parallel grooves in the surface of a road as the frame is carried along the road at substantial uniform speed without stopping and indexing as each individual groove is cut in the road surface, each groove being of a shape complementary to a portion of the curved surface of the cutting cylinder.

9. The apparatus of claim 8 wherein said means for moving said cylinder up and down includes a linear hydraulic motor.

10. The apparatus of claim 8 including means for spraying a liquid onto a region adjacent the lower portion of at least one side of said cylinder.

11. The apparatus of claim 8 including means to limit the depth of downward travel of said cylinder, to thereby limit the depth of the grooves formed by the cylinder.

12. The apparatus of claim 11 wherein said depth limiting means including at least one wheel carried by and at least partially supporting said frame, said wheel adapted to engage a road surface.

13. The apparatus of claim 11 wherein said depth limiting means includes three wheels, two of which are mounted on the frame on one side of the cutting cylinder and one of which is mounted in the frame on the other side of the cutting cylinder.

* * * * *

UNITED STATES PATENT AND TRADEMARK OFFICE
CERTIFICATE OF CORRECTION

PATENT NO. : 4,701,069

DATED : October 20, 1987

INVENTOR(S) : James R. Whitney

It is certified that error appears in the above-identified patent and that said Letters Patent is hereby corrected as shown below:

Line 1 of Claim 2 should read "of claim 1" instead of "of claim 10".

Signed and Sealed this

Twelfth Day of April, 1988

Attest:

DONALD J. QUIGG

Attesting Officer

Commissioner of Patents and Trademarks

(12) EX PARTE REEXAMINATION CERTIFICATE (5325th)
United States Patent
Whitney

(10) Number: US 4,701,069 C1
(45) Certificate Issued: Apr. 11, 2006

(54) RAIN DRAINAGE GROOVES IN A ROAD AND APPARATUS FOR MAKING THEM

(75) Inventor: James R. Whitney, Woodbridge, VA (US)

(73) Assignee: Glen E. Thomas, Moore Haven, FL (US)

Reexamination Request:
No. 90/006,320, Jul. 9, 2002

Reexamination Certificate for:
Patent No.: 4,701,069
Issued: Oct. 20, 1987
Appl. No.: 06/940,055
Filed: Dec. 10, 1986

Certificate of Correction issued Apr. 12, 1988.

(51) Int. Cl.
*E01C 11/22* (2006.01)
*E01F 9/047* (2006.01)
*E01F 9/053* (2006.01)

(52) U.S. Cl. ............... 404/75; 404/16; 404/4; 404/94; 404/96; 404/98; 299/39.6; 116/63 R

(58) Field of Classification Search .............. None
See application file for complete search history.

(56) References Cited

U.S. PATENT DOCUMENTS

| 3,975,055 A | 8/1976 | Wirtgen | 299/39 |
|---|---|---|---|
| 4,463,989 A | 8/1984 | Kennedy | 299/39 |
| 4,723,867 A | 2/1988 | Wirtgen | 404/90 |

OTHER PUBLICATIONS

California Department of Transportation Highway Research Report, entitled Devices To Prevent Run Off Road Accidents, Feb. 1976, pp. 16 and 18.

*Primary Examiner*—Gary S. Hartmann

(57) ABSTRACT

An apparatus and method for cutting rain drainage grooves in a road surface, such as at the edges of the road to form a road marker system. A cutting cylinder rotates about its longitudinal axis, the latter lying in a substantially horizontal plane and at some angle, generally a right angle, to the road direction. The cutting cylinder is mounted on a frame, the latter attached to and carried by an automotive vehicle such as a truck. As the truck travels along the road, the cutting cylinder is moved alternately up and down, into the road surface, and forms the grooves. The cutting cylinder can be slightly tilted, so as to produce grooves of variable width and depth. The truck moves along the road being grooved at a substantially uniform speed. Preferably, the slopping side walls of the grooves are coated with a retro reflective coating. The grooves continuously drain rain so that the retro reflective coating is visible during hours of darkness and rain, to maintain visibility of the road edge to drivers. The grooves also function as a rumble strip.

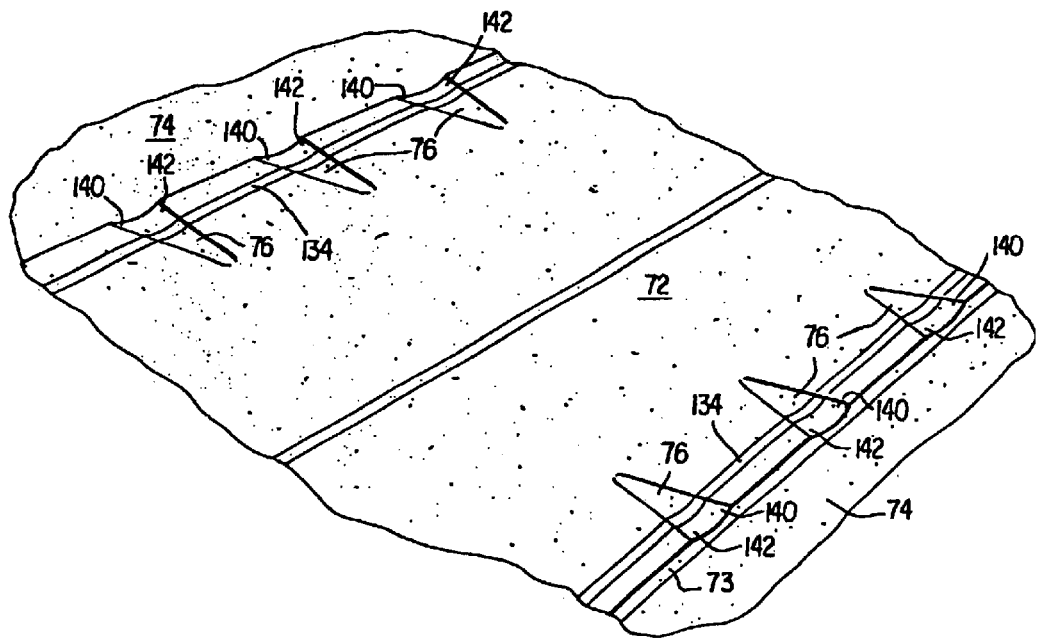

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–7 is confirmed.

Claims 8–13 are cancelled.

New claim 14 is added and determined to be patentable.

*14. A method of forming a plurality of rumble strips in the surface of a road, said road including at least one travel lane portion and a shoulder portion adjacent the travel lane portion on at least one side of the travel lane portion, the method including the steps of rotating a cutting cylinder about an axis which is substantially horizontal and which axis is at an angle to the longitudinal direction of the road, said axis being substantially perpendicular to the longitudinal direction of the road, moving the rotating cutting cylinder along the road at a substantially uniform speed, and simultaneously, moving said cylinder alternately up above the road surface in the shoulder portion and down into the road surface in the shoulder portion in a continuous and uniform manner to thereby form a plurality of generally parallel rumble strips in the shoulder portion, each rumble strip having an elongated dimension extending substantially perpendicular to the longitudinal, travel direction of the road and a width dimension extending substantially parallel to the longitudinal, travel direction of the road, said width dimension being shorter than the elongated dimension, each rumble strip providing a forward side wall and a rearward side wall, said forward side wall and said rearward side wall each extending substantially parallel to the elongated dimension and substantially perpendicular to the longitudinal, travel direction of the road, said forward side wall being positioned forward of the rearward side wall along the longitudinal, travel direction of the road.*

\* \* \* \* \*